(12) United States Patent
Amador et al.

(10) Patent No.: US 12,242,370 B2
(45) Date of Patent: Mar. 4, 2025

(54) INTENT-BASED CHAOS LEVEL CREATION TO VARIABLY TEST ENVIRONMENTS

(71) Applicant: Cisco Technology, Inc., San Jose, CA (US)

(72) Inventors: Marisol Palmero Amador, Toledo (ES); Kanishka Priyadharshini Annamali, Theni (IN); Sebastian Jeuk, Munich (DE); Sayali Patil, Nashik (IN); Michael Francois Karl Wielpuetz, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 17/871,508

(22) Filed: Jul. 22, 2022

(65) Prior Publication Data

US 2024/0028499 A1 Jan. 25, 2024

(51) Int. Cl.
*G06F 9/44* (2018.01)
*G06F 11/3668* (2025.01)

(52) U.S. Cl.
CPC ...... *G06F 11/3684* (2013.01); *G06F 11/3688* (2013.01); *G06F 11/3692* (2013.01)

(58) Field of Classification Search
CPC .................................................. G06F 11/3694
USPC ......................................................... 717/124
See application file for complete search history.

(56) References Cited

U.S. PATENT DOCUMENTS

| 11,223,552 B1 | 1/2022 | Anderson et al. |
| 11,388,081 B1* | 7/2022 | Sommers ................ H04L 49/70 |
| 2021/0092143 A1* | 3/2021 | Sbandi ................ H04L 63/1433 |
| 2021/0263836 A1* | 8/2021 | Singh .................. G06F 11/3664 |
| 2022/0308972 A1* | 9/2022 | Anand ........... G06Q 10/063112 |

(Continued)

FOREIGN PATENT DOCUMENTS

| CN | 110765023 A | 2/2020 |
| CN | 113687918 A | 11/2021 |

OTHER PUBLICATIONS

LoadView "How to Find the Web Application Breaking Point with Load Testing", Oct. 8, 2019, 6 pages, [online] Retrieved Jun. 26, 2024 from <https://www.dotcom-monitor.com/wiki/knowledge-base/how-to-find-web-application-breaking-point/ > (Year: 2019).*

(Continued)

*Primary Examiner* — Evral E Bodden
(74) *Attorney, Agent, or Firm* — Lee & Hayes, P.C.

(57) ABSTRACT

A method includes receiving, at a chaos level engine, initial input parameters. The method may further include, with the chaos level engine, determining scaled input parameters based on the initial input parameters. The scaled input parameters define how the initial input parameters effect a computing environment to be tested. The method may further include, with the chaos level engine determining a chaos level for performing a chaos experiment on the computing environment based on the scaled input parameters and sending the chaos level to the computing environment for the chaos experiment. The method may further include, with the chaos level engine, receiving, from the computing environment, feedback defining an impact caused by the chaos experiment created at the computing environment and an intended level of chaos.

20 Claims, 7 Drawing Sheets

(56) References Cited

U.S. PATENT DOCUMENTS

2023/0333880 A1* 10/2023 White .................. G06F 9/4881

OTHER PUBLICATIONS

Basiri et al., "Automating chaos experiments in production," arXiv:1905.04648v1, May 2019, 10 pages.
Netflix, "ChAP: Chaos Automation Platform," Jul. 26, 2017, downloaded on Jul. 21, 2022 fom https://netflixtechblog.com/chap-chaos-automation-platform-53e6d528371f, 7 pages.
Netflix, "FIT Failure Injection Testing," Oct. 23, 2014, downloaded on Jul. 21, 2022 from https://netflixtechblog.com/fit-failure-injection-testing-35d8e2a9bb2, 6 pages.
Tucker et al., "The Business Case for Chaos Engineering," IEEE Cloud Computing 5(3):Jun. 2018, pp. 45-54.

* cited by examiner

INTENT-BASED CHAOS LEVEL CREATION TO VARIABLY TEST ENVIRONMENTS

TECHNICAL FIELD

The present disclosure relates generally to software development. Specifically, the present disclosure relates to systems and methods for scaling chaos experimentation within a computing system for intent-based, variable testing.

BACKGROUND

Chaos engineering is a software engineering technique used to achieve resilience against infrastructure failures, network failures, link failures, and application failures. Using chaos engineering, a software system in production may be experimented upon in order to build confidence in the capabilities of a system including the infrastructure, network, and applications executed thereon. Thus, chaos testing assists a user in understanding how well a computing system or environment can withstand turbulent and unexpected conditions including failures. The production environment may be defined as a setting where software, hardware, and/or other products are actually put into operation for their intended uses by a number of end users or an administrator of the production environment.

Simple statistics-defined chaos testing may not be a sufficient level of testing given the dynamic networking and networking services available today. Further, simply adding chaos into a production environment in order to determine the robustness of the production environment may be difficult for an owner of the production environment to accept since too much chaos within their network may render the production environment at least partially inoperable. Further, dynamically the chaos introduced to a network environment may assist in testing that production environment, but it is impossible to predict how the chaos entered into the production environment will affect customers and the network.

Further, in many instances, it may prove helpful to understand how faults are introduced into a computing system, and through which processes the faults are injected into the production environment. In some instances, a failure may be injected into the computing device or a parent process. This may be achieved by shutting a physical interface down or performing other failures within the computing system. While some use cases may require a hard failure such as the shutting down of the physical interface, not all use cases require such hard failures. A number of use cases may utilize experimentation techniques that control the injection of failures with the help of designing different types of failure scenarios and parameters including, for example, error probabilities, fault downtime, minimum wait time between faults, etc., in realistic production conditions in order to enhance the robustness of the network, the computing device, etc. In all of these and scenarios, however, injection of inappropriate failures may significantly impact the production environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
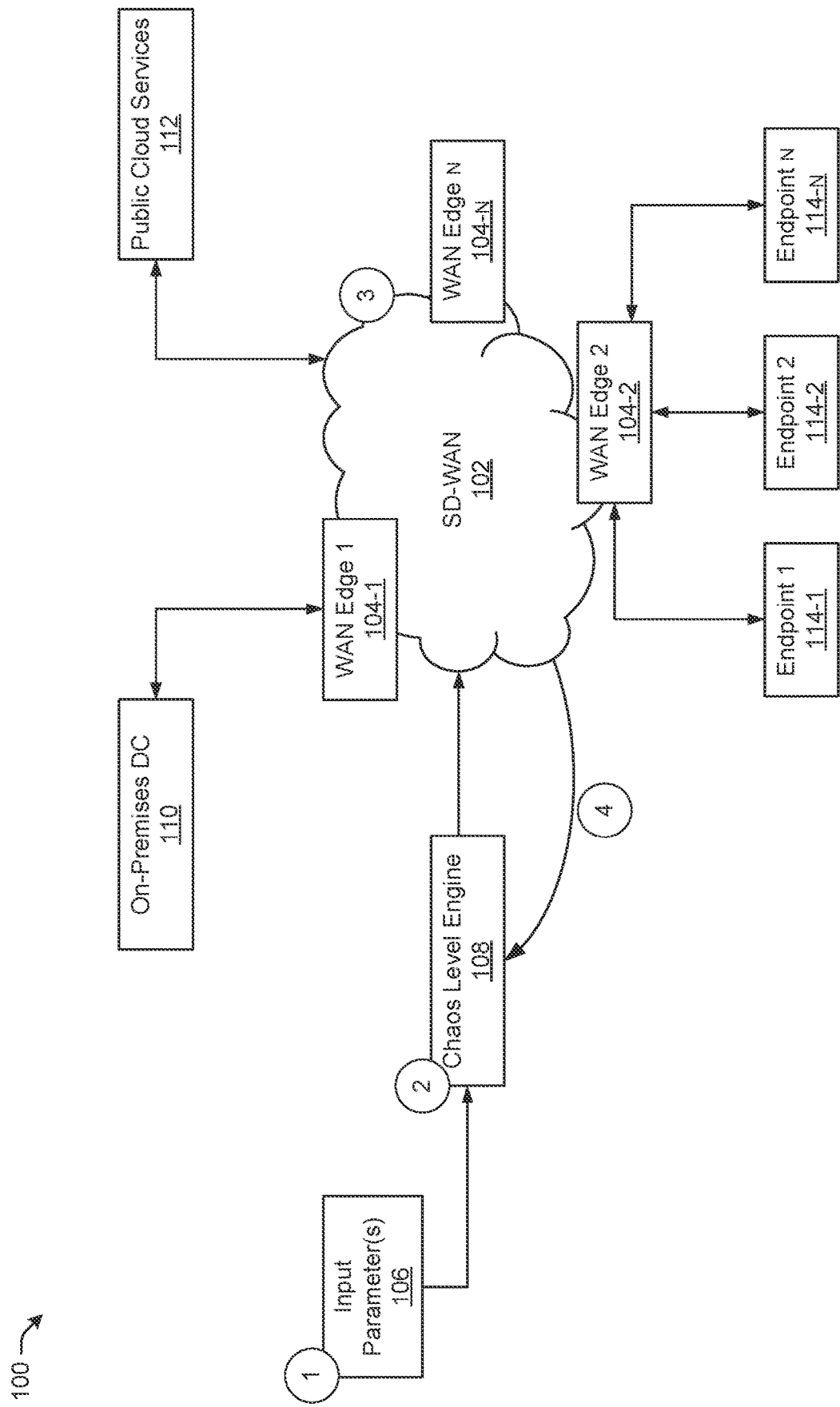
FIG. 1 illustrates a system-architecture diagram of a network embodying a production environment for chaos experimentation, according to an example of the principles described herein.

As described above, chaos engineering may include a software engineering technique used to achieve resilience against infrastructure failures, network failures, link failures, application failures, and other failures within a production environment or computing system. Using chaos engineering, the production environment (e.g., a software system in production) may be experimented upon in order to build confidence in the capabilities of the production environment including the infrastructure, network, applications executed thereon, and other aspects of the production environment to withstand turbulent and unexpected conditions including failures.

In order to overcome the issue of potentially impacting or overly impacting the production environment of a computing system and/or network, the present systems and methods utilize a chaos scale that may augment a chaos network controller (CNC) and allows a user to inject appropriate failures based on the network topology. The chaos scale may be used to measure a degree of failure injections with respect to a range of predictable outcomes. Chaos experiments may be automatically generated and executed based on the chaos scale. The chaos experiments may be used to determine how well a production environment can handle component failures and other types of failures. The present systems and methods also allow for retraining the chaos scale and/or the CNC with respect to the percentage of chaos introduced into the production environment.

Previous chaos engineering techniques may focus on injecting failures into a production environment and how to inject the failures in order to avoid future outages in a network. The CNC may be used to introduce or inject a number of failures into the production environment be means of, for example, a chaos network injection failure probes (NIFP) and chaos network enhanced in-situ operations, administration, and maintenance (IOAM). IOAM may be used for recording and collecting operational and telemetry information while the packet traverses a path between two points in the network. In one example, IOAM data fields may be encapsulated with a network service header (NSH). These previous chaos engineering endeavors may create a framework for injecting network failures and gathering more details on the impact of the failures to make the network more reliable and robust.

In contrast, the present systems and methods provide for guidance as to how much chaos may be introduced into a production environment from a range of expected outcomes to unexpected outcomes. The chaos scale described herein avoids or created high impactful failures into the network that affects customers or users of that network. Further, the metrics used to represent the chaos scale may be dynamic and continually change based on the infrastructure and/or production environment.

The range of the scale may be estimated based on a type of customer network(s) targeted, historical logs, records, reports, technical assistance center (TAC) cases, bug repository, documentation, and machine learning (ML) predictions, or combinations thereof. Once customer network configuration data are obtained as per the chaos fault injection experimentations, the scale ranges may be defined based on the supporting parameters.

The chaos level determined via the systems and methods described herein assist in understanding the risk of introducing or injecting chaos testing or experimentation into a production environment. Further, the chaos level determined via the systems and methods described herein provide a measure of how far the chaos experimentation is deviating away from an intended network security, scalability, resiliency, performance, and combinations thereof.

Overview

In the examples described herein includes the use of a chaos level for chaos engineering within a network production environment. The present systems and methods may measure a range of predictable outcomes for automatically generating a number of chaos experiments via a chaos level algorithm. The chaos experiments may be executed and controlled to determine how well the production environment can handle component failures, slowdowns, and other types of failures. The present systems and methods also include the retraining of the chaos level introduced into the production environment based on feedback obtained from a previous instance of introduction of a chaos level. The chaos level assists in understanding the risks associated with introducing chaos testing into the production environment and may be used to measure how large of a deviation from the network security, scalability, resiliency, and performance of the production environment is occurring.

Examples described herein provide a method including receiving, at a chaos level engine, initial input parameters. The method may further include, with the chaos level engine, determining scaled input parameters based on the initial input parameters. The scaled input parameters define how the initial input parameters effect a computing environment to be tested. The method may further include, with the chaos level engine determining a chaos level for performing a chaos experiment on the computing environment based on the scaled input parameters and sending the chaos level to the computing environment for the chaos experiment. The method may further include, with the chaos level engine, receiving, from the computing environment, feedback defining an impact caused by the chaos experiment created at the computing environment and an intended level of chaos.

The method may further include receiving, at the chaos level engine, the feedback and utilizing the feedback to define adjusted input parameters. The method may further include determining scaled adjusted input parameters based on the adjusted input parameters. The scaled adjusted input parameters define how the adjusted input parameters effect the computing environment. The method may further include determining a subsequent chaos level for performing the chaos experiment on the computing environment based on the scaled adjusted input parameters and sending the subsequent chaos level to the computing environment for the chaos experiment. The method may further include receiving, from the computing environment, subsequent feedback defining a subsequent impact created at the computing environment caused by the chaos experiment as defined by the subsequent chaos level and the intended level of chaos. The chaos level engine may determine the chaos level based at least in part on at least one of topology-based telemetry, dynamic network telemetry, dynamic security telemetry, previously observed values determined by an intelligent artificial intelligence (AI) engine, or combinations thereof.

The method may further include determining the initial input parameters, the scaled input parameters, the adjusted input parameters, the scaled adjusted input parameters, or combinations thereof based at least in part on metadata obtained from at least one computing device within the computing environment. The initial input parameters, the scaled input parameters, the adjusted input parameters, the scaled adjusted input parameters, or combinations thereof may include metadata defining bandwidth, jitter, or latency, a number of nodes within the computing environment, or combinations thereof. The method may further include displaying on a user interface (UI) information defining the chaos level introduced to the computing environment or introducible to the computing environment.

Examples described herein further provide a system including a processor and a non-transitory computer-readable media storing instructions that, when executed by the processor, causes the processor to perform a number of operations. The operations may include receiving, at a chaos level engine, initial input parameters. The operations may further include, with the chaos level engine, determining scaled input parameters based on the initial input parameters. The scaled input parameters defining how the initial input parameters effect a computing environment to be tested. The operations may further include determining a chaos level for performing a chaos experiment on the computing environment based on the scaled input parameters, sending the chaos level to the computing environment for the chaos experiment, and receiving, from the computing environment, feedback defining an impact caused by the chaos experiment created at the computing environment and an intended level of chaos.

The operations may further include receiving, at the chaos level engine, the feedback, utilizing the feedback to define adjusted input parameters, and determining scaled adjusted input parameters based on the adjusted input parameters. The scaled adjusted input parameters define how the adjusted input parameters effect the computing environment. The operations may further include determining a subsequent chaos level for performing the chaos experiment on the computing environment based on the scaled adjusted input parameters and sending the subsequent chaos level to the computing environment for the chaos experiment.

The operations may further include receiving, from the computing environment, subsequent feedback defining a subsequent impact created at the computing environment caused by the chaos experiment as defined by the subsequent chaos level and the intended level of chaos.

The chaos level engine may determine the chaos level based at least in part on at least one of topology-based telemetry, dynamic network telemetry, dynamic security telemetry, previously observed values determined by an intelligent artificial intelligence (AI) engine, or combinations thereof.

The operations may further include determining the initial input parameters, the scaled input parameters, the adjusted input parameters, the scaled adjusted input parameters, or combinations thereof based at least in part on metadata obtained from at least one computing device within the computing environment. The initial input parameters, the scaled input parameters, the adjusted input parameters, the scaled adjusted input parameters, or combinations thereof may include metadata defining bandwidth, jitter, or latency, a number of nodes within the computing environment, or combinations thereof. The system may include a secure access service edge (SASE) environment, a cloud access security broker (CASB), a chaos network controller (CNC), a software-defined wide area network (SD-WAN), a number of edge nodes, public cloud services, a domain controller (DC), an on-premises DC, the chaos level engine, number of endpoints, or combinations thereof. The operations may further include displaying on a user interface (UI) information defining the chaos level introduced to the computing environment or introducible to the computing environment.

Examples described herein further provide a non-transitory computer-readable medium storing instructions that, when executed, causes a processor to perform a number of operations. The operations may include receiving, at a chaos level engine, initial input parameters. The operations may further include, with the chaos level engine, determining scaled input parameters based on the initial input parameters. The scaled input parameters defining how the initial input parameters effect a computing environment to be tested. The operations may further include determining a chaos level for performing a chaos experiment on the computing environment based on the scaled input parameters, sending the chaos level to the computing environment for the chaos experiment, and receiving, from the computing environment, feedback defining an impact caused by the chaos experiment created at the computing environment and an intended level of chaos.

The operations may further include receiving, at the chaos level engine, the feedback, utilizing the feedback to define adjusted input parameters, and determining scaled adjusted input parameters based on the adjusted input parameters. The scaled adjusted input parameters define how the adjusted input parameters effect the computing environment. The operations may further include determining a subsequent chaos level for performing the chaos experiment on the computing environment based on the scaled adjusted input parameters and sending the subsequent chaos level to the computing environment for the chaos experiment.

The operations may further include receiving, from the computing environment, subsequent feedback defining a subsequent impact created at the computing environment caused by the chaos experiment as defined by the subsequent chaos level and the intended level of chaos. The chaos level engine may determine the chaos level based at least in part on at least one of topology-based telemetry, dynamic network telemetry, dynamic security telemetry, previously observed values determined by an intelligent artificial intelligence (AI) engine, or combinations thereof.

The operations may further include determining the initial input parameters, the scaled input parameters, the adjusted input parameters, the scaled adjusted input parameters, or combinations thereof based at least in part on metadata obtained from at least one computing device within the computing environment. The initial input parameters, the scaled input parameters, the adjusted input parameters, the scaled adjusted input parameters, or combinations thereof may include metadata defining bandwidth, jitter, or latency, a number of nodes within the computing environment, or combinations thereof. The operations may further include displaying on a user interface (UI) information defining the chaos level introduced to the computing environment or introducible to the computing environment.

As used in the present specification and in the appended claims, the term "production environment" is meant to be understood broadly as any setting in which hardware-based products and/or software-based products are actually put into operation for their intended uses by end users. The production environment may include any aspect of the any layer of a network protocol stack including, for example, any host layer including the application layer, the presentation layer, the session layer, and the transport layer, and any media layer including the network layer, the data link layer, and the physical layer, and combinations thereof. Thus, computing systems, computing networks, computing devices or a collection of computing devices, software, or any other computing domain may qualify as at least a part of the production environment. The present systems and methods describe instances where chaos engineering may be applied to the production environment to inject failures at a designated chaos level. The production environment may also refer to a "system under test" where the system under test is being subjected to chaos testing.

Although the examples described herein are applied in connection with a production environment, the present systems, methods, and non-transitory computer-readable medium may be applied to other computing environments including a staging environment, a pre-staging environment, integration environment, and other computing environments. Thus, the present systems, methods, and non-transitory computer-readable medium may be applied to may be applied to any computing environment, with the production environment being include herein as an example of a computing environment.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram of a network 100 embodying a production environment for chaos experimentation, according to an example of the principles described herein. The network 100 may include a software-defined wide area network (SD-WAN) 102 including any wide area network (WAN) that utilizes software-defined network technologies to provide communication via, for example, the Internet. The SD-WAN 102 may include, for example, a gateway to provide access to the services of the SD-WAN 102 in order to shorten the distance to cloud-based services (e.g., the public cloud services 112) or a number of users (e.g., endpoints 114-1, 114-2, . . . 114-N, where N is any integer greater than or equal to 1 (collectively referred to herein as endpoint(s) 114 unless specifically addressed otherwise)).

The SD-WAN 102 may also include, for example, an SD-WAN orchestrator and/or controller (e.g., on-premises domain controller (DC) 110) used to make forwarding decisions for application flows, and provide for configuration, provisioning, and other functions associated with the operation of the SD-WAN 102. The SD-WAN orchestrator and/or controller may simplify application traffic management by allowing central implementation of an organization's business policies.

The SD-WAN 102 may also include, for example, a number of WAN edges 104-1, 104-2, . . . 104-N, where N is any integer greater than or equal to 1 (collectively referred to herein as WAN edge(s) 104 unless specifically addressed otherwise)). The WAN edges 104 may include any physical or virtual network function placed at, for example, an organization's branch, regional, or central office sites, a data center, in public or private cloud platforms, or combinations thereof. The WAN edges 104 may include a secure access service edge (SASE) that incorporates network and security capabilities to more efficiently and securely connect distributed work environments (branch office, headquarters, home office, remote, etc.) to distributed applications located in data centers, cloud infrastructure, or delivered by software-as-a-service (SaaS) services. Through the use of SASE technologies, the SD-WAN 102 may be combined with other network and security technologies including, for example, cloud access security broker (CASB), a chaos network controller (CNC), a secure web gateway, data loss prevention (DLP) services, firewall devices and services, and other capabilities to connect and protect users and applications on the SD-WAN 102. Although a SASE environment including an SD-WAN 102 is illustrated in connection with the examples described herein, any type of network topology and devices may be used.

The on-premises DC 110 may be any server computing device that responds to security authentication requests within a computer network domain such as the network 100 and allows a host access to domain resources. In one example, the on-premises DC 110 may be installed and run on computers on the premises of the individual or organization using the software executed by the on-premises DC 110 rather than at a remote facility such as a server farm or cloud.

The public cloud services 112 may include any on-demand computing services and infrastructure as managed by a third-party provider and shared with multiple organizations using the public Internet. In one example, the administrator or other individual controlling the network 100 and/or the SD-WAN 102 may be a tenant utilizing the public cloud services 112.

The endpoints 114 may include any computing device that accesses a number of services made available by the network 100 and the SD-WAN 102 as part of a client-server model of the network 100. In one example, the endpoints 114 may include, for example, routers, switches, desktop computers, laptops, tablets, mobile phones, Internet-of-things devices, and other wired or wireless devices coupled to the SD-WAN 102.

Further, a chaos level engine 108 may be communicatively coupled to the SD-WAN 102. The chaos level engine 108 may perform a number of operations related to the receipt of a number of input parameters defining aspects of the network 100, determining how the input parameters will affect the production environment to be tested (e.g., the network 100), scaling the input parameters, sending the scaled parameters to the production environment, executing a number of chaos experiments on the network 100 or portions thereof based on the scaled input parameters, and receiving feedback defining an impact the chaos experiments on the network 100.

The chaos provided via the chaos experimentation described herein may be introduced at any layer of a network protocol stack of the network 100 including, for example, any host layer including the application layer, the presentation layer, the session layer, and the transport layer, and any media layer including the network layer, the data link layer, and the physical layer, and combinations thereof. Chaos experimentation may include the injection of one or more failures into the network to determine whether the network is resilient and robust enough to fail over to other devices and maintain an appropriate quality of service (QoS) level for an end user. Based on the output of the chaos experimentation, the network 100 and any associated devices may be given more computing resources to ensure that failures similar to those in the chaos experimentation do not affect the QoS in potential future instances of authentic, real world failures (e.g., non-chaos experiment-initiated failures).

The present systems and methods may process the chaos experimentation as indicated in FIG. 1 as indicated the numerals "1," "2," "3," and "4." At 1, a number of input parameters 106 may be provided to the chaos level engine 108. The input parameters may include a chaos level, metadata defining bandwidth, jitter, or latency, a number of nodes within the production environment, and combinations thereof. Further, the input parameters 106 may be defined by an end-user such as a tenant or a user of an endpoint 114. In one example, the input parameters 106 may be defined by any computing device within the network 100 such as, for example, the chaos level engine 108, the on-premises DC 110, or one of the endpoints 114. Further, in one example, the input parameters 106 may be defined through machine learning algorithms or artificial intelligence processes.

The chaos level and input parameters may be sent to the chaos level engine 108 at 2. The chaos level engine 108 receives the input and, based on the defined or intended chaos level, determines the chaos to be introduced into the production environment. As described herein, the production environment may include any computing devices within the network 100 including the SD-WAN 102, the WAN edges 104, the public cloud services 112, the on-premises DC 110, the endpoints 114, any constituents of the computing devices within the network 100, and combinations thereof. The chaos level engine 108 may determine the chaos to be entered into the production environment based on the intended chaos level. Thus, the production environment including the network 100 and any combination of its constituents becomes the "system under test" when the chaos is introduced.

With regard to the level and scale of chaos introduced into the production environment, it is noted that too much chaos may result in a decrease in a quality of service (QoS) level for an end user, an increase in downtime of the network 100, and/or even irreparable damage to the production environment. It is not an intent of chaos experimentation to reduce the QoS experienced by and end user to any degree. In fact, the chaos experimentation may be performed without an end user experiencing or knowing of the chaos experimentation taking place. The intent of the chaos experimentation is to determine how well the production environment may overcome failure and provide for failover within the production environment. Failover may include switching to a number of redundant or standby computer servers, systems, hardware components or networks upon the failure or abnormal termination of the previously active application, server, system, hardware component, or network in a computer network. The chaos experimentation may cause one or more devices within the production environment fail in anticipation that the production environment will allow processes to failover to redundant devices. For example, the chaos experimentation may cause WAN edge N 104-N to fail in anticipation that either WAN edge 1 104-1 or WAN edge 2 104-2 is able to act as redundant WAN edge for WAN edge N 104-N. Thus, one purpose of chaos experimentation is to determine how well the production environment is able to withstand and recover from the failures introduced by the chaos. The chaos level, therefore, may be defined such that instances of unrecoverability is not experienced within the production environment and/or the QoS provided by the production environment is not reduced.

The chaos level engine 108 may determine a chaos scale for chaos engineering for the production environment including on the network 100. Network operators and engineers may be hesitant to experiment on the production environment since such chaos experimentation may result in unpredictable outcomes and failures in the production environment and within the network 100. An unpredictable outcome may include the degradation of the QoS described herein. Providing a number of benefits of chaos experiments across different modules in the production environment may be challenging, but the present systems and methods provide the chaos scale developed based on insights and data available from past events, logs, reports, failures, service requests, bugs, and other historical data. Based on this historical data, a range of chaos may assist in performing chaos experimentation with predictable outcomes and provide a degree of control over the production environment.

The scaling of chaos introduced into the production environment may include defining a range of how much chaos is to be or may be introduced into the production environment while conveying knowledge to a user as to what may be defined as too much or too little chaos introduced into the production environment. Too little chaos introduced into the production environment may result in a relatively less effective chaos experimentation of the production environment that does not significantly require the production environment to deal with failures. Similarly, too much chaos introduced into the production environment may result in a decrease in the QoS level for an end user, an increase in downtime of the network 100, and/or even irreparable damage to the production environment including the network 100 and its constituents.

As indicated above, the range defined by the chaos scale may be based on historical data associated with the network 100, the type of the network 100, the type and number of devices within the network 100, customer profiles, and other relevant data associated with the network 100. For example, when building the network 100 for a customer, the chaos for that particular customer and network 100 may be defined. In this example, the historical data may include historical data related to a number of other customers for which a similar or identical network has been implemented including the historical data related to the applications or software executed on that similar or identical network, the computing devices within that similar or identical network, and other aspects of that similar or identical network. Further, the historical data may include historical data related to previous implementations of the present network 100 as previously implemented for the customer and any features of those previous implementations. With this historical data, the chaos level engine 108 is able to more effectively determine an appropriate scale of chaos to be introduced into the production environment and the resulting chaos level that will serve as the basis for the chaos experimentation of the network 100. Thus, in this manner, the scaling of the chaos and the resulting chaos level determined by the chaos level engine 108 may be different or may change for different customers, different networks, and different scenarios. Further, the scaling of the chaos and the resulting chaos level determined by the chaos level engine 108 may be dynamic based on feedback provided to the chaos level engine 108 as described herein.

The chaos level may be defined using the following formula:

$$\text{Chaos Level} = \text{topology based telemetry} + \text{dynamic network telemetry} + \text{dynamic security telemetry} + \text{intelligent engine values} \quad \text{Eq. 1}$$

The topology-based telemetry data may include any data related to the topology of the network including, for example, the physical and/or logical topology of the network 100, the number and types of computing devices within the network 100 (e.g., the SD-WAN 102, the WAN edges 104, the on-premises DC 110, the public cloud services 112, the endpoints 114, etc.), the arrangement of the types of computing devices within the network 100, and combinations thereof.

The chaos level as defined in Eq. 1 may include additional variables not presented in Eq. 1. Further, the variables of Eq. 1 may be weighted. The weighting of the variables may be based on the situation or use case presented in the network 100. For example, a tenant may wish to focus on the security aspects of the network 100 when performing the chaos experiments. In this example, the dynamic security telemetry data may be given more weight in determining the chaos level and the focus of the chaos experimentation.

Further, in relation to the example of FIG. 1, the tenant may desire to introduce the determined chaos level to the secure access service edge (SASE) environment as depicted in FIG. 1. In this example, the SASE environment may serve as a good example since the SASE environment may rely on autonomous forwarding adjustments that are based on endpoint 114 and application needs. Thus, in this example, chaos experimentation may have more or less impact on the endpoint(s) 114 depending on the defined chaos level, and weighting relatively more heavily on, for example, the dynamic network telemetry. In other examples, other variables of Eq. 1 may be weighted more heavily to account for different scenarios.

The chaos level engine 108 is depicted in FIG. 1 is depicted as being communicatively coupled to the SD-WAN 102 but not necessarily a part of the SD-WAN 102. However, in one example, the chaos level engine 108 may be included as part of the SD-WAN 102 such as part of the on-premises DC 110, a WAN edge 104, or other part of the network 100. In one example, the chaos level engine 108 may be included as part of a CNC, a CASB, a DC, or other type of controller.

Again, at 2 of FIG. 1, the chaos level engine 108 may send the chaos level determined by the chaos level engine 108 to the production environment including the network 100 and/or the SD-WAN 102 as part of a chaos experiment. In one example, the chaos level engine 108 may determine a range of predictable outcomes for automatically generating the chaos experiment. The chaos level engine 108 generates the chaos experiment used to test the production environment (e.g., the network 100 including the SD-WAN 102). The example of FIG. 1 where the network 100 include a SASE environment including the SD-WAN 102 is an example of the topology of the network 100. However, the network 100 may include any type of network with any number of various computing devices and applications executed thereon.

At 3 of FIG. 1, the chaos level is used to test the production environment as part of the chaos experiment. Therefore, at 3, chaos as defined by the chaos level is introduced into the system under test. As described herein, the chaos may include any form of failure introduced into any layer of a network protocol stack. The chaos experimentation and testing described herein may be performed on the production environment including the network 100 while the production environment is live, network traffic is being transmitted, and users of, for example, the endpoints 114 are utilizing the services provided by the network 100. This live testing is done to ensure that the impact of the chaos introduced into the production environment and the resultant errors are identifiable and to place the production environment in a real world situation where actual failures may occur.

In one example, the chaos experiment may be applied to test communication patterns of a number of applications executed on the network 100. In this example, the network 100 may include a microservice architecture that arranges an application as a collection of loosely-coupled services. The microservice architecture in this example may exhibit patterns that guarantee that the application is working and can scale out according to the current load placed on the application. For example, the microservice architecture may include a 3-tier web application in which the web layer, application layer, and database layer are continually working and provide scalability. The network 100 may be tasked with ensuring that, for example, the high-availability requirements of the application are met. The chaos level engine 108 may generate a specific chaos experiment with a corresponding chaos level and underlying input parameters that are configured to test the high-availability and scalability requirements of the 3-tier web application. To test the high-availability and scalability requirements of the microservice architecture and the associated 3-tier web application in the network 100, chaos load testing as a form of chaos experimentation may be applied to shutdown a number of interfaces within the 3-tier web application in order to make sure that the application traffic continues to be handled by redundant interfaces provided by the scalability and high-availability of the 3-tier web application.

In one example the high-availability requirements of a CASB may be tested within a SASE environment. In this example, the chaos level engine 108 may generate a chaos experiment and chaos level that simulates a failure of one or more cluster nodes within the CASB. In this example, possible input parameters underlying the chaos level may include the number of nodes in a distributed system that are to be affected by the chaos experiment.

In one example, the chaos level engine 108 may be used to not only simulate a failure of individual nodes of a distributed system in order to test failover and redundancy, but also to test an effect of latency in microservice architectures. In this example, the chaos level engine 108 may generate a chaos experiment that simulates latency within a caching system of a 3-tier web application executed on the network 100. In this example, the impact of latency on a user experience within the microservice at, for example, an endpoint 114 may be tested. In this manner, the chaos level generated by the chaos level engine 108 may be used to set a latency value used within the chaos experiment.

Thus, based on the examples described herein, the chaos level engine 108 may generate chaos experiment(s) specific to a given type of network 100 and the aspects of the network 100 that are to be tested.

At 4 of FIG. 1, once the chaos experiment is executed on the network 100, the chaos level engine 108 may receive feedback from the production environment (e.g., the network 100 and/or the SD-WAN 102) as the system under test. The feedback may include data defining an impact the chaos experiment had on the production environment at the chaos level defined by the chaos level engine 108. The chaos level defined by the chaos level engine 108 may be referred to herein as an intended chaos level. The feedback may be used by the chaos level engine 108 to define a number of adjusted input parameters. The adjusted input parameters may, in turn, be used to determine scaled adjusted input parameters based on the adjusted input parameters. The scaled adjusted input parameters define how the adjusted input parameters effect the production environment and may be determined in a similar manner as how the chaos level engine 108 define how the initial input parameters obtained at 1 of FIG. 1 define how the initial input parameters effect a production environment to be tested.

The chaos level engine 108 may determine a subsequent chaos level for performing the chaos experiment on the production environment based on the scaled adjusted input parameters. In this manner, the subsequent chaos level represents a refined and adjusted chaos level that may more effectively test the production environment. A change in an attribute of the production environment by the chaos experiment may introduce a change in the chaos level. Further, a changed induced in an attribute of the production environment by the chaos experiment should remain within a threshold level of predictability so that the production environment may failover to other resources during the chaos experiment and not result in a reduction in the QoS for an end user of the production environment, increase downtime of the network 100, and/or even produce irreparable damage to the production environment.

Returning again to 4 of FIG. 1, the subsequent chaos level may include a higher or lower chaos level relative to the initial chaos level. The chaos level and any subsequent chaos levels may have a dependency on the amount of change that may be introduced into the product environment. In one example, the higher the chaos level, the change introduced into the production environment may be relatively more unpredictable. For example, introduction of a 10 millisecond (ms) delay or latency into the production environment when no chaos in the production environment exists is significantly different than introducing the same amount of delay or latency when chaos is relatively higher in the production environment. Chaos will likely be relatively more unpredictable when the chaos score is high. In this manner, a relatively higher chaos level generated by the chaos level engine 108 for the chaos experiment may result in a relatively higher unpredictability as to the change induced by the chaos level. In one example, the chaos level generated by the chaos level engine 108 at the outset may actually result in an intent a user defined initially.

Once the subsequent chaos level and the associated chaos experiment are generated by the chaos level engine 108, the chaos level engine 108 may send the subsequent chaos level to the production environment for the subsequent chaos experiment. In this manner, the present systems and methods provide for a feedback loop between 2, 3, and 4 of FIG. 1. This feedback loop provides for the ability to retain the chaos introduced in the production environment and may include a percentage of the chaos initially introduced to the production environment. This process increases the effectiveness of chaos experimentation within the production environment including the network 100 and the SDOWAN 102. The chaos level assists in understanding risks of introducing chaos testing. Further, the chaos level may assist in measuring how far the chaos experimentation is deviating away from given network security, scalability, resiliency, and performance targets.

Figure 2:
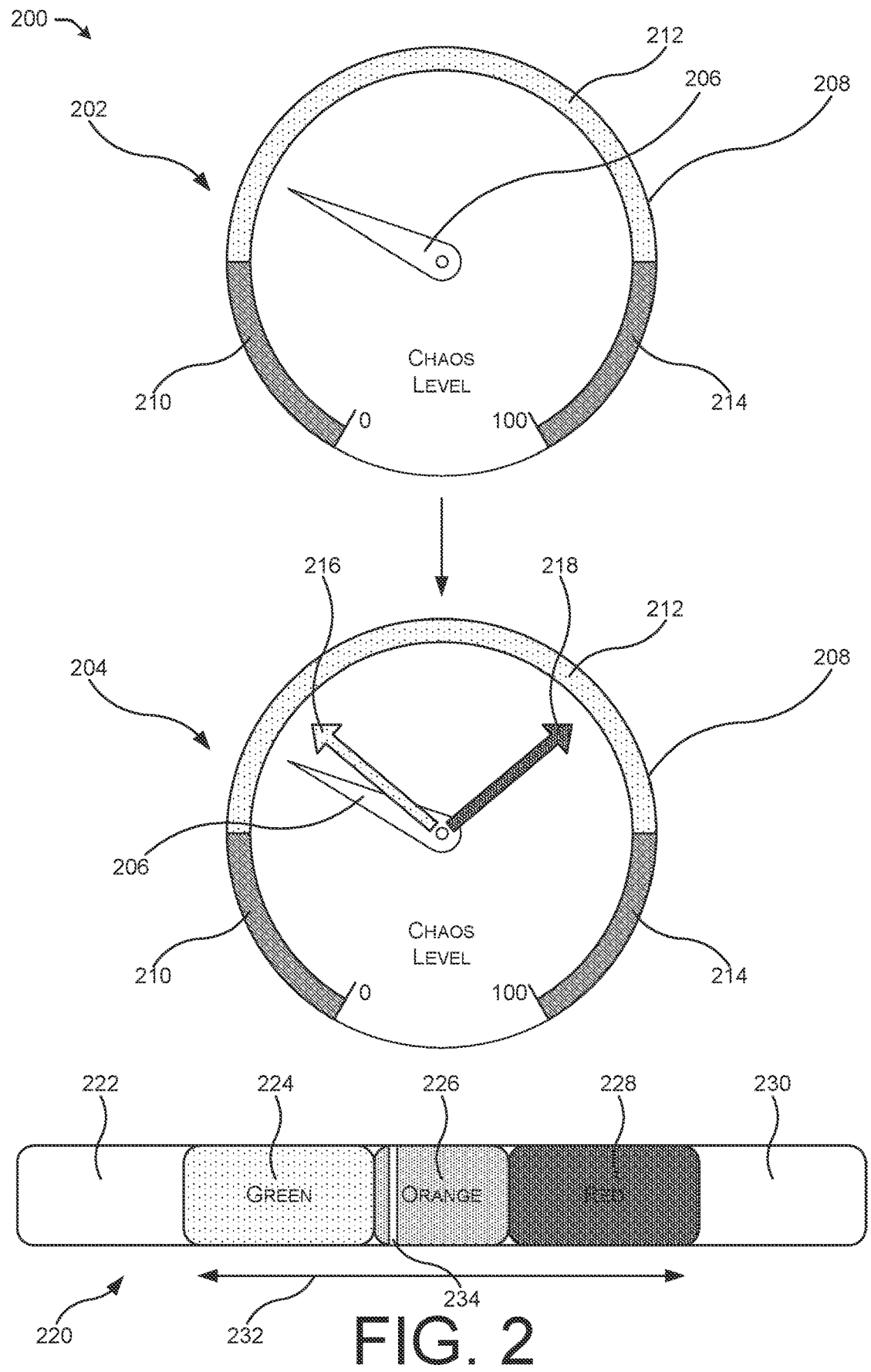
FIG. 2 illustrates a user interface (UI) for present information related to a chaos level, according to an example of the principles described herein.

FIG. 2 illustrates a user interface (UI) 200 for present information related to a chaos level, according to an example of the principles described herein. The UI 200 may be presented to an administrator, a tenant or other user before, during, and/or after execution of a chaos experiment. The UI 200 illustrated in FIG. 2 may provide a user with information related to the chaos level within the production environment (e.g., the network 100 and the SD-WAN 102). The UI 200 may include a graphical user interface (GUI), a command line interrace (CLI), a menu-driven interface, a touch UI, a voice UI, a form-based UI, and a natural language UI, among others.

The UI 200 may include a first dial 202 and a second dial 204. The first dial 202 may be presented to the user as an indicator as to what the chaos level of the chaos experiment is before any change is introduced by the chaos experiment. The first dial 202 may include a chaos level indicator 206 that indicates the initial chaos level. The chaos level indicator 206 may point at portion of a ring 208 that indicates the initial chaos level between, for example, "0" and "100." The ring 208 may include a first portion 210, a second portion 212, and a third portion 214. In one example, the first portion 210 may designate a chaos level at which no significant chaos experimentation occurs, or very little chaos experimentation occurs. The second portion 212 may designate an appropriate range of chaos level at which a meaningful or significant chaos experimentation occurs. The third portion 214 may designate a chaos level at which too high of a level of chaos experimentation occurs such that a decrease in a QoS level for an end user of the production environment, an increase in downtime of the network 100, irreparable damage to the production environment, and/or other types of destructive or disabling chaos experimentation occurs.

The second dial 204 may be presented to the user as an indicator as to what the chaos level of the chaos experiment is after any change is introduced by the chaos experiment. In the example of FIG. 2, the second dial 204 indicates a 10% change in one or more attributes of the production environment. The second dial 204, like the first dial 202, may include a chaos level indicator 206, the ring 208, the first portion 210, a second portion 212, and the third portion 214. The second dial 204 may also include a green indicator 216 and a red indicator 218. The green indicator 216 may be used to indicate an appropriate level of chaos that may be introduced into the production environment below which the execution of the chaos experiment would have insignificant results in chaos experimentation. The red indicator 218 may be used to indicate a boundary of an appropriate level of chaos that may be introduced into the production environment above which the execution of the chaos experiment would have a significant detrimental impact on the production environment.

The UI 200 may further include a change indicator 220 that indicates a change of the chaos level. An attribute change may introduce a change in the chaos level. Because the change in the attribute introduced into the production environment should be predictable to one degree or another. The change indicator 220 may include a first blank portion 222, a green portion 224, an orange portion 226, a red portion 228, and a second blank portion 230. Further, the change indicator 220 may also include a range indicator 232 that may be used to indicate a safe and/or effective range of chaos levels that may be applied in the chaos experiment. In one example, the range indicator 232 may include user-interactive elements that allow a user to select a higher or lower chaos level with a bar indicator 234 that may shift in response to the user interacting with the range indicator 232. In one example, the bar indicator 234 may shift from right to left based on the input parameters and/or a user-defined chaos level entered by the user.

The first blank portion 222 may designate a chaos level at which no significant chaos experimentation occurs, or very little chaos experimentation occurs in a manner similar to the first portion 210 of the first dial 202 and the second dial 204. The green portion 224, the orange portion 226, and the red portion 228 may designate an appropriate range of chaos level at which a meaningful or significant chaos experimentation occurs. The second blank portion 230 may designate a chaos level at which too high of a level of chaos experimentation occurs such that a decrease in a QoS level for an end user of the production environment, an increase in downtime of the network 100, irreparable damage to the production environment, and/or other types of destructive or disabling chaos experimentation occurs in a manner similar to the third portion 214 of the first dial 202 and the second dial 204.

The features of the UI 200 of FIG. 2 may be presented to a tenant, an administrator, or other individual involved with the chaos experimentation performed on the production environment. In one example, the production environment (e.g., the network 100) may be services provided to a tenant in an Infrastructure-as-a-service (IaaS) instance where computing resources are hosted in a public, private, or hybrid cloud and high-level UIs 200 may be used to dereference various low-level details of underlying network infrastructure are provided to the tenant. These details of the underlying network infrastructure may include, for example, backup, data partitioning, scaling, security, and physical computing resources, among other network infrastructure elements.

Figure 3:
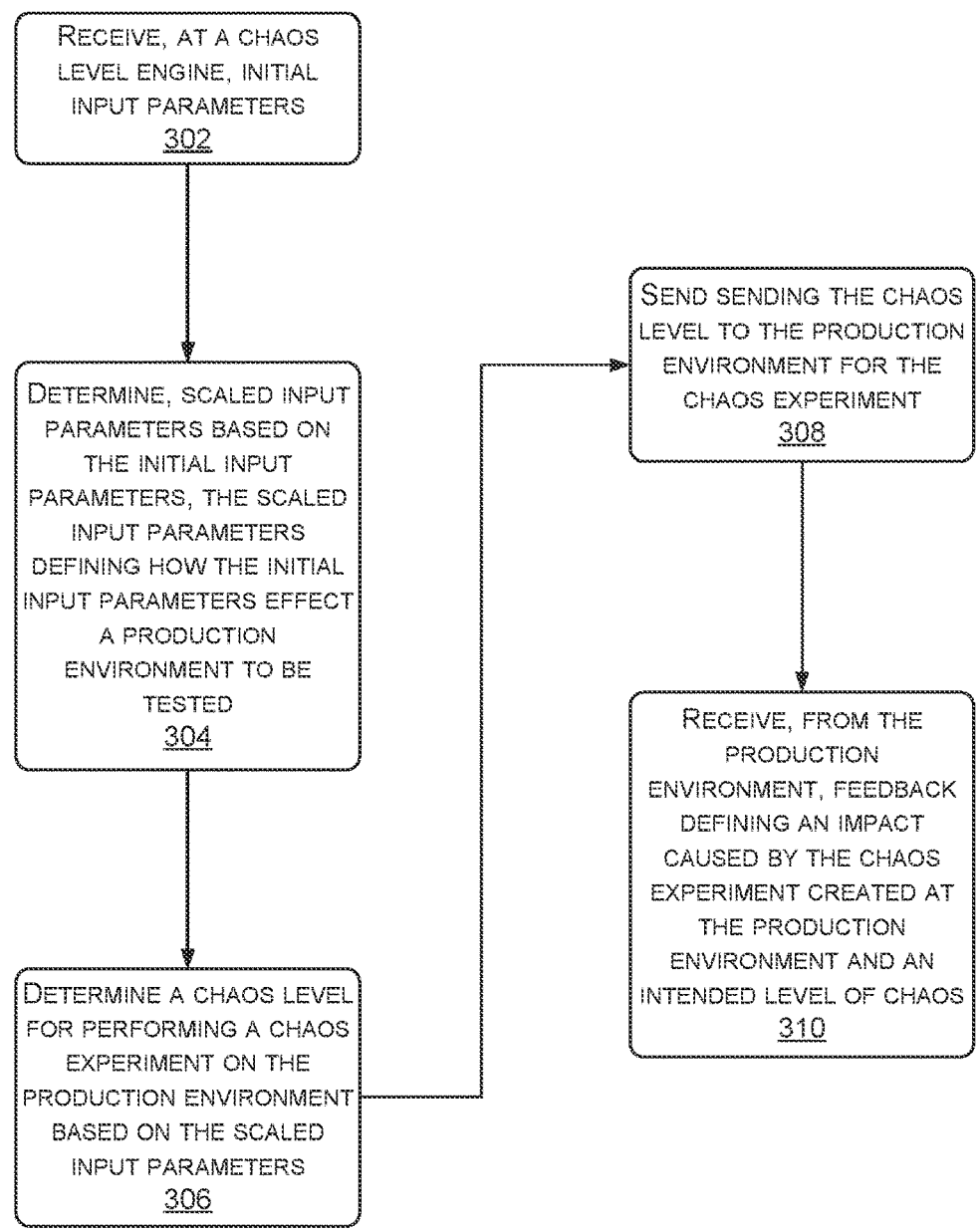
FIG. 3 illustrates a flow diagram of an example method for creating and introducing the chaos level within a production environment, according to an example of the principles described herein.

FIG. 3 illustrates a flow diagram of an example method 300 for creating and introducing the chaos level within a production environment, according to an example of the principles described herein. The method 300 may include at 302 receiving, at the chaos level engine 108, initial input parameters. The chaos level engine 108 may determine scaled input parameters based on the initial input parameters at 304. The scaled input parameters define how the initial input parameters effect a production environment to be tested.

At 306, the chaos level engine 108 may determine a chaos level for performing a chaos experiment on the production environment based on the scaled input parameters. In one example, the UI 200 may be presented to the user indicating the chaos level before the chaos experiment and/or the chaos level determined by the chaos level engine 108 based on the scaled input parameters.

The chaos level engine 108, at 308, may send the chaos level to the production environment for the chaos experiment. The chaos level engine 108 further generates the chaos experiment for execution on the production environment with the chaos experiment introducing chaos into the production environment based on the chaos level.

At 310, the chaos level engine 108 receives, from the production environment, feedback defining an impact caused by the chaos experiment created at the production environment and an intended level of chaos. In one example, the outcome of the chaos experiment may be presented via the UI 200 such that the UI 200 indicates to the user the actual impact of the chaos level determined by the chaos level engine 108, where that chaos level falls within the range of acceptable chaos levels, and whether the chaos level may be refined or retrained to produce a more effective chaos level in a subsequent chaos experiment. More details regarding the methods described herein is provided in connection with FIG. 4.

Figure 4:
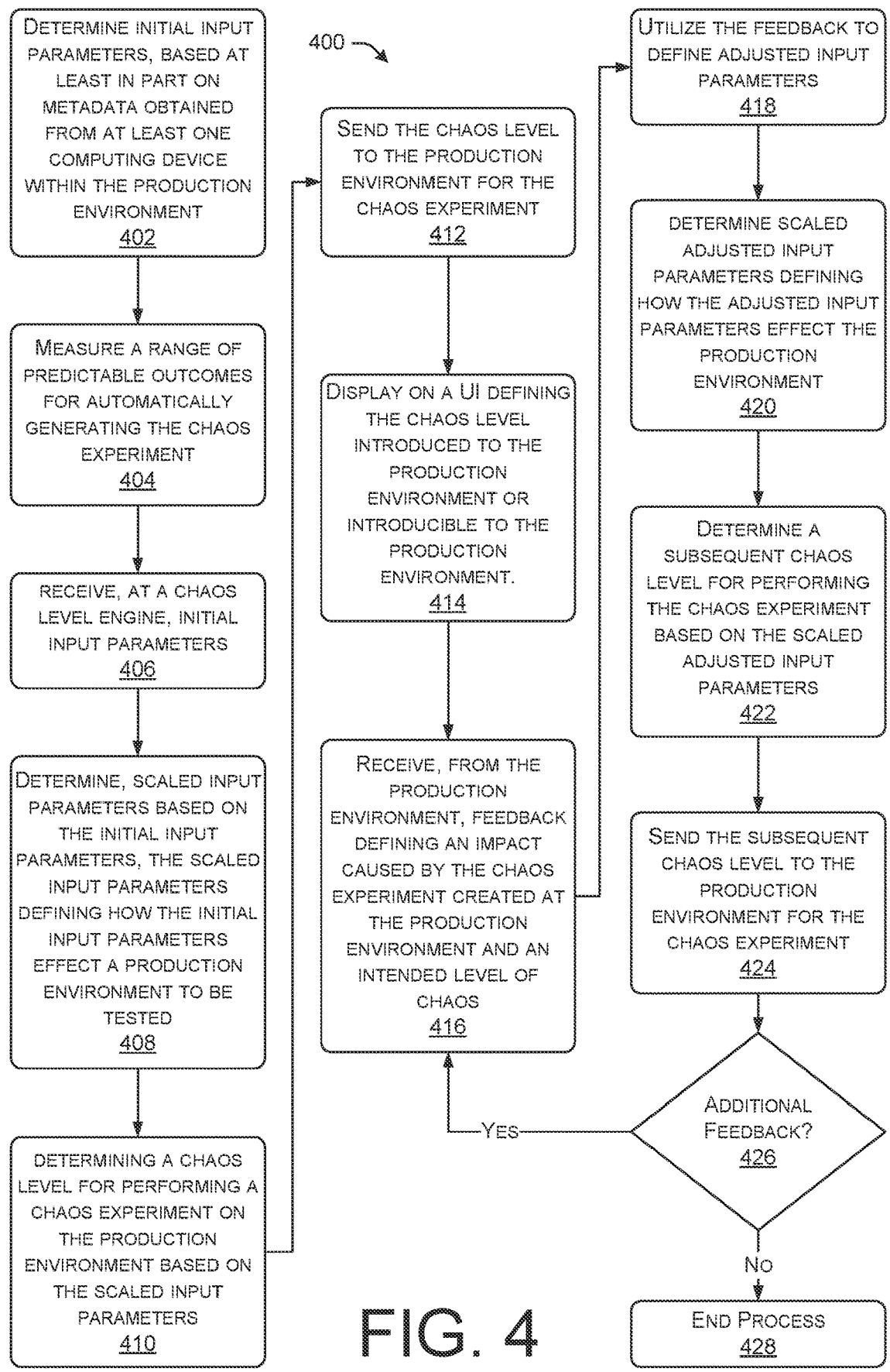
FIG. 4 illustrates a flow diagram of an example method for creating and introducing the chaos level within a production environment, according to an example of the principles described herein.

FIG. 4 illustrates a flow diagram of an example method 400 for creating and introducing the chaos level within a production environment, according to an example of the principles described herein. The method 400 of FIG. 4 may include, at 402, determining a number of initial input parameters based at least in part on metadata obtained from at least one computing device within the production environment. In one example, the chaos level engine 108 determines the initial input parameters or other input parameters described herein. In one example, the initial input parameters and other input parameters may be provided by or defined by a user or other individual based on chaos experimentation goals. In one example, the initial input parameters or other input parameters may be defined by a combination of user input and determination by the chaos level engine 108. The initial input parameters may include any metadata obtained in preparation for an initial chaos experiment to be performed on the production environment. In subsequent processes, scaled input parameters, adjusted input parameters, scaled adjusted input parameters, and combinations thereof may be determined by the chaos level engine 108, user input, and combinations thereof.

At 404, the chaos level engine 108 may measure or determine a range of predictable outcomes for automatically generating a number of chaos experiments via a chaos level algorithm such as the chaos level algorithm of Eq. 1. The chaos experiments may be executed and controlled to determine how well the production environment can handle component failures, slowdowns, and other types of failures. Further, the chaos level determined by the chaos level engine 108 assists in understanding the risks associated with introducing chaos testing into the production environment and may be used to measure how large of a deviation from the network security, scalability, resiliency, and performance of the production environment is occurring. Knowing the range of predictable outcomes may provide the present systems and methods with a better understanding of what is an acceptable chaos level and avoiding a too low, ineffective chaos levels as well as too high, QoS level decreasing chaos levels.

At 406, the method 400 may include receiving, at the chaos level engine 108, initial input parameters determined at 402. With the initial input parameters, the chaos level engine 108 may determine, at 408, scaled input parameters based on the initial input parameters at 408. The scaled input parameters define how the initial input parameters effect a production environment to be tested.

At 410, the chaos level engine 108 may determine a chaos level for performing a chaos experiment on the production environment based on the scaled input parameters. In one example, the UI 200 may be presented to the user indicating the chaos level before the chaos experiment and/or the chaos level determined by the chaos level engine 108 based on the scaled input parameters.

The chaos level engine 108, at 412, may send the chaos level to the production environment for the chaos experiment. The chaos level engine 108 further generates the chaos experiment for execution on the production environment with the chaos experiment introducing chaos into the production environment based on the chaos level.

The UI 200 may then be presented, at 414, via the chaos level engine 108 or other controller, information defining the chaos level introduced to the production environment or introducible to the production environment. As described herein, the UI may be displayed before, during, and/or after any execution of a chaos experiment on the production environment in order to inform a user of the effectiveness of the chaos level associated with the chaos experiments.

The chaos level engine 108 may measure an impact placed on the production environment by the chaos experiment. The feedback may include, for example, data defining the impact caused by the chaos experiment on the production environment, an intended chaos level, and other data that may prove helpful in retraining the chaos level. Thus, at 416, the chaos level engine 108 may receive, from the production environment, feedback defining an impact caused by the chaos experiment created at the production environment and an intended level of chaos. In one example, the outcome of the chaos experiment may be presented via the UI 200 such that the UI 200 indicates to the user the actual impact of the chaos level determined by the chaos level engine 108, where that chaos level falls within the range of acceptable chaos levels, and whether the chaos level may be refined or retrained to produce a more effective chaos level in a subsequent chaos experiment.

At 416, the feedback may be used to refine and retrain the chaos introduced in the production environment in an initial or a previous chaos experiment. A subsequent iteration of a chaos experiment may retrain the previous chaos level such that a percentage of the chaos introduced in the initial or a previous chaos experiment is introduced on the subsequent iteration of a chaos experiment. In this manner, the retraining of the chaos level through iterations of the chaos experiment using the feedback obtained at 416 assist in understanding the risks of introducing chaos testing and a measure of how far the system may deviate away from given network security, scalability, resiliency, and performance. Thus, at 418, the feedback may be utilizing to define adjusted input parameters. The adjusted input parameters reflect the retraining of the chaos level as described herein.

At 420, the chaos level engine 108 may determining scaled adjusted input parameters based on the adjusted input parameters, the scaled adjusted input parameters defining how the adjusted input parameters effect the production environment. The chaos level engine 108 may, at 422, determine a subsequent chaos level for performing the chaos experiment on the production environment based on the scaled adjusted input parameters determined at 420. At 424, the chaos level engine 108 may send the subsequent chaos level to the production environment for the chaos experiment. In this manner, a second or subsequent iteration of a chaos experiment may be executed with the retrained chaos level.

At 426, the chaos level engine 108 or other controller may determine whether additional feedback is received and/or should be utilized to retrain the chaos level. In response to a determination that the additional feedback is not to be received and/or should be utilized to retrain the chaos level, the process may end at 428. However, in response to a determination that the additional feedback is to be received and/or should be utilized to retrain the chaos level, the method may loop to 416 where the feedback is received and allowed to be processed as indicated in 418-424. This loop process of 416-426 may be performed any number of iterations to allow for the production environment (e.g., the network 100 and/or the SD-WAN 102) to be continually testing how well a computing system or production environment may withstand turbulent and unexpected conditions including failures.

Figure 5:
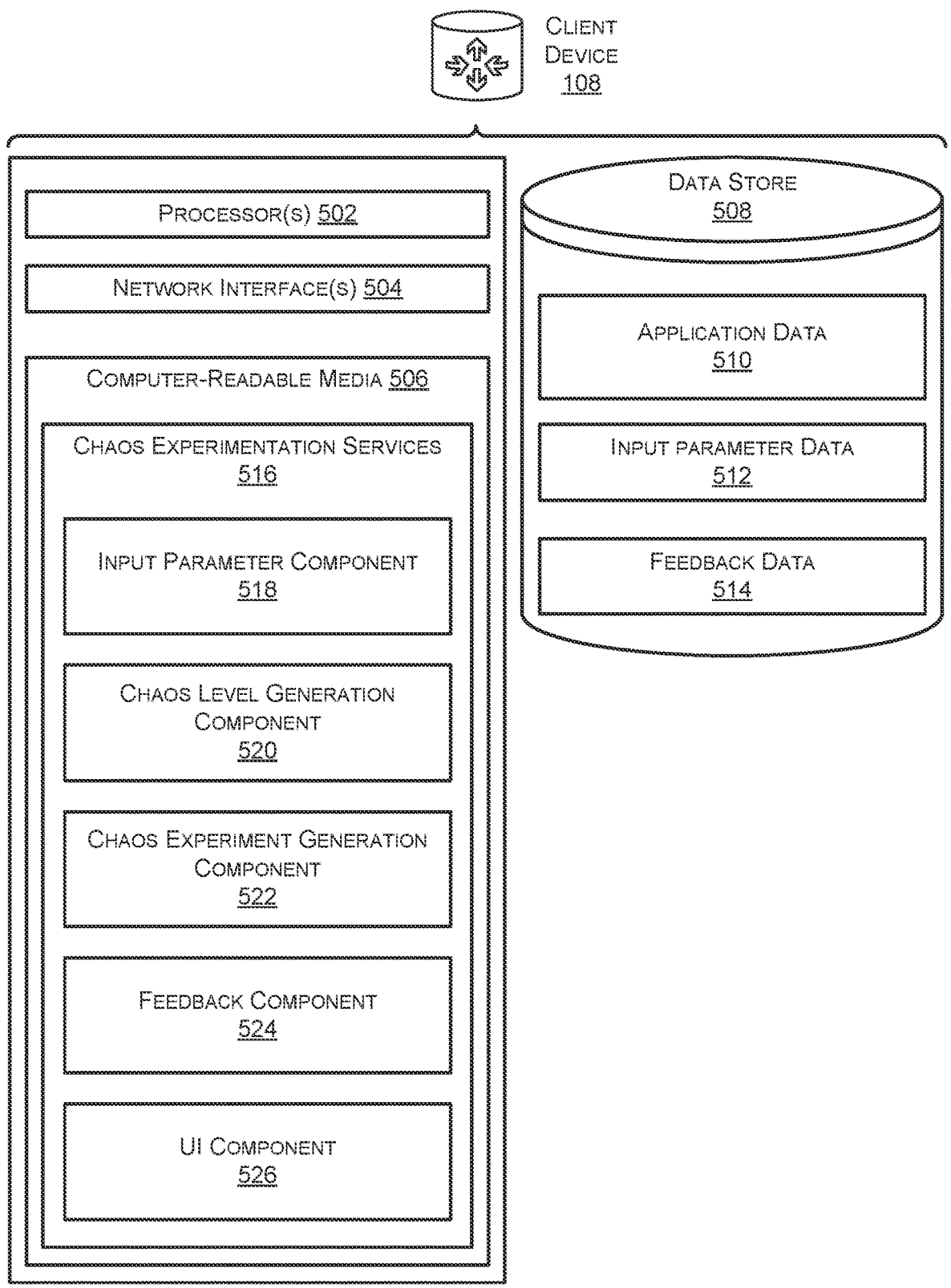
FIG. 5 is a component diagram of example components of a chaos level engine, according to an example of the principles described herein.

Having described the process by which the present systems and methods may be utilized to provide an intent-based chaos level creation to variably test a production environment, FIG. 5 is a component diagram of example components of a chaos level engine 108, according to an example of the principles described herein. The chaos level engine 108 may be embodied as part of a controller device or as the controller device used to control the chaos experimentation within a production environment (e.g., the network 100 and/or the SD-WAN 102). As illustrated in FIG. 5, the chaos level engine 108 may include one or more hardware processor(s) 502 configured to execute one or more stored instructions. The processor(s) 502 may comprise one or more cores. Further, the chaos level engine 108 may include one or more network interfaces 504 configured to provide communications between the chaos level engine 108 and other devices, such as devices associated with the system architecture of FIG. 1 including the SD-WAN 102, the WAN edges 104, the public cloud services 112, the on-premises DC 110, the endpoints 114, any constituents of the computing devices within the network 100, other systems or devices associated with the chaos level engine 108 and/or remote from the chaos level engine 108, and combinations thereof. The network interfaces 504 may include devices configured to couple to personal area networks (PANs), wired and wireless local area networks (LANs), wired and wireless wide area networks (WANs), and so forth. For example, the network interfaces 504 may include devices compatible with the SD-WAN 102, the WAN edges 104, the public cloud services 112, the on-premises DC 110, the endpoints 114, any constituents of the computing devices within the network 100, other systems or devices associated with the chaos level engine 108 and/or remote from the chaos level engine 108, and combinations thereof.

The chaos level engine 108 may also include computer-readable media 506 that stores various executable components (e.g., software-based components, firmware-based components, etc.). In one example, the computer-readable media 506 may include, for example, working memory, random access memory (RAM), read only memory (ROM), and other forms of persistent, non-persistent, volatile, non-volatile, and other types of data storage. In addition to various components discussed herein, the computer-readable media 506 may further store components to implement functionality described herein. While not illustrated, the computer-readable media 506 may store one or more operating systems utilized to control the operation of the one or more devices that comprise the chaos level engine 108. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the chaos level engine 108 may include a data store 508 which may comprise one, or multiple, repositories or other storage locations for persistently storing and managing collections of data such as databases, simple files, binary, and/or any other data. The data store 508 may include one or more storage locations that may be managed by one or more database management systems. The data store 508 may store, for example, application data 510 defining computer-executable code utilized by the processor 502 to execute a number of processes or applications. Further, the application data 510 may include data relating to user preferences associated with the chaos experimentation processes described herein, the UI 200 presented to the user, and other data that may be used by the chaos level engine 108 to receive input parameters, generate a chaos level based on the input parameters, generate a chaos experiment including the chaos level, send the chaos experiment and chaos level to a production environment, execute the chaos experiment, receive feedback, apply the feedback to retrain the chaos level, perform other processes described herein, and combinations thereof.

Further, the data store 508 may store input parameter data 512. The input parameter data 512 may include any data obtained by the chaos level engine 108 regarding the input parameters or adjusted input parameters used to generate a chaos level and an associated chaos experiment. This input parameter data 512 may include, for example, metadata defining bandwidth, jitter, or latency, a number of nodes within the production environment, other parameters related to the production environment (e.g., the network 100 and/or the SD-WAN 102), and other data described herein that may assist in the chaos experimentation processes described herein.

Further, the data store 508 may store feedback data 514. The feedback data 514 may include any data obtained by the chaos level engine 108 in response to an iteration of a chaos experiment. This feedback data 514 may include, for example, data defining the impact caused by the chaos experiment on the production environment, an intended chaos level, and other data described herein that may assist in preparing a subsequent chaos experiment with an associated subsequent chaos level as described herein.

The computer-readable media 506 may store portions, or components, of chaos experimentation services 516. For instance, the chaos experimentation services 516 of the computer-readable media 506 may include an input parameter component 518 to, when executed by the processor(s) 502, receive input as defined by an end-user such as a tenant or a user of an endpoint 114, any computing device within the network 100 such as, for example, the chaos level engine 108, the on-premises DC 110, or one of the endpoints 114, through machine learning algorithms or artificial intelligence processes, and combinations thereof. The input parameter component 518 may obtain the input parameters and/or the adjusted input parameters and scale the input parameters and/or the adjusted input parameters to obtain scaled input parameters and/or scaled adjusted input parameters defining how the input parameters effect a production environment to be tested. Further, the input parameter component 518 may store the input parameters and/or the adjusted input parameters along with their scaled versions as input parameter data 512 in the data store 508. The input parameter component 518 may include all or a portion of the executable code associated with the chaos level engine 108 and may be executed to bring about the functionality of the chaos level engine 108 as described herein.

The chaos experimentation services 516 of the computer-readable media 506 may further include a chaos level generation component 520 to, when executed by the processor(s) 502, utilize the input parameters to generate a chaos level defining a level of chaos to be introduced into the production environment during the chaos experiment. The chaos level generation component 520 may include all or a portion of the executable code associated with the chaos level engine 108 and may be executed to bring about the functionality of the chaos level engine 108 as described herein.

The chaos experimentation services 516 of the computer-readable media 506 may further include a chaos experiment generation component 522 to, when executed by the processor(s) 502, generate the chaos experiment based on or including the chaos level. The chaos experiment generated by the chaos experiment generation component 522 may be sent by the chaos level engine 108 executing the chaos experiment generation component 522 to a production environment to test the resiliency and robustness of the production environment against infrastructure failures, network failures, link failures, application failures and other types of failures. The chaos experiment generation component 522 may include all or a portion of the executable code associated with the chaos level engine 108 and may be executed to bring about the functionality of the chaos level engine 108 as described herein.

The chaos experimentation services 516 of the computer-readable media 506 may further include a feedback component 524 to, when executed by the processor(s) 502, monitors or measures an impact the chaos experiment has on the production environment and other types of feedback defining the effectiveness and appropriateness of the chaos experiment. The feedback component 524 may also, when executed by the processor(s) 502, provide input parameters as derived from the feedback to the input parameter component 518. The feedback component 524 may include all or a portion of the executable code associated with the chaos level engine 108 and may be executed to bring about the functionality of the chaos level engine 108 as described herein.

The chaos experimentation services 516 of the computer-readable media 506 may further include an UI component 526 to, when executed by the processor(s) 502, present a UI such as the UI illustrated in FIG. 2 to a user. The UI component 526 to, when executed by the processor(s) 502, may present the UI before, during, and/or after any execution of a chaos experiment on the production environment in order to inform a user of the effectiveness of the chaos level associated with the chaos experiments. The UI component 526 may include all or a portion of the executable code associated with the chaos level engine 108 and may be executed to bring about the functionality of the chaos level engine 108 as described herein.

Figure 6:
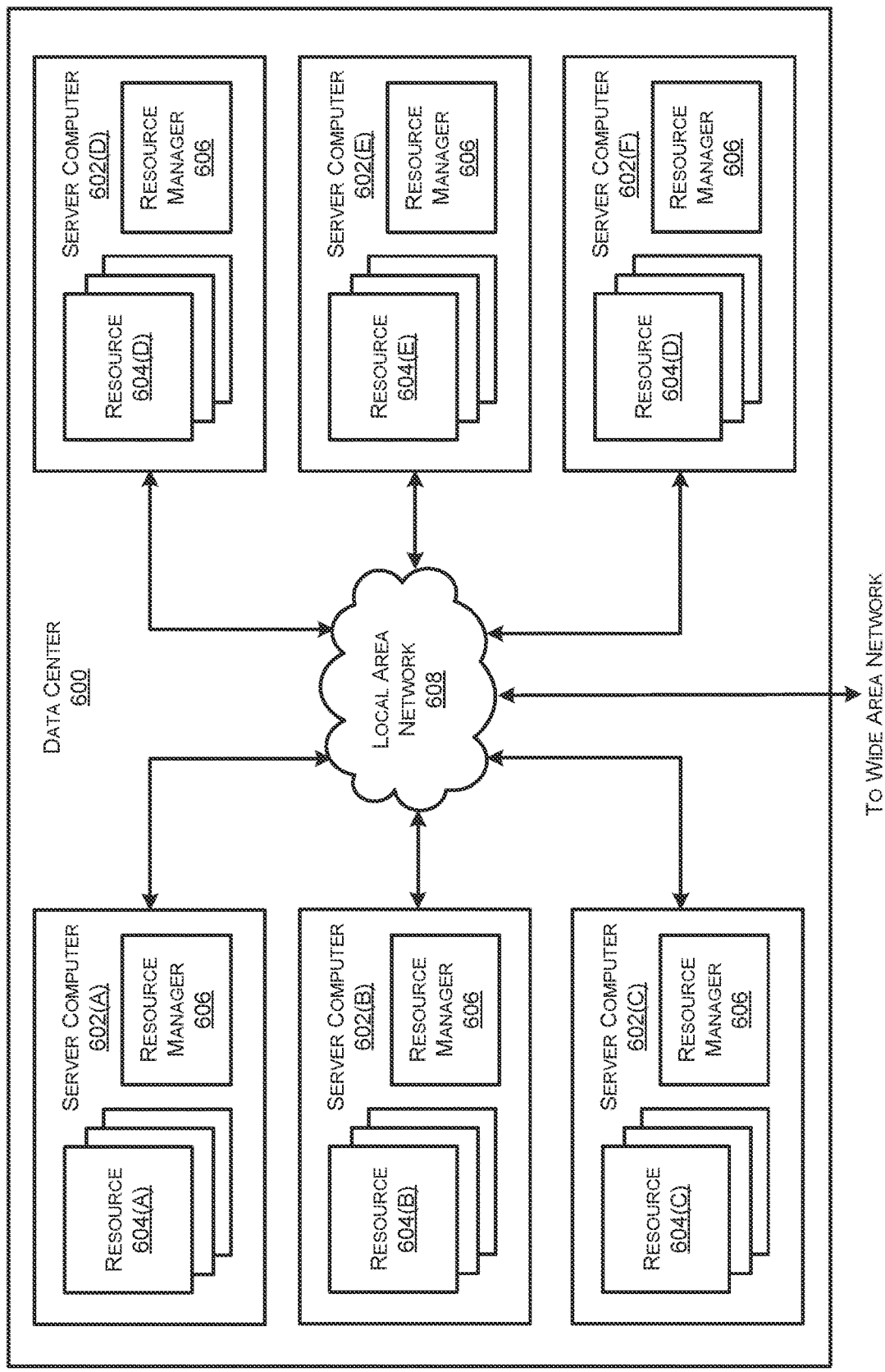
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-802F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
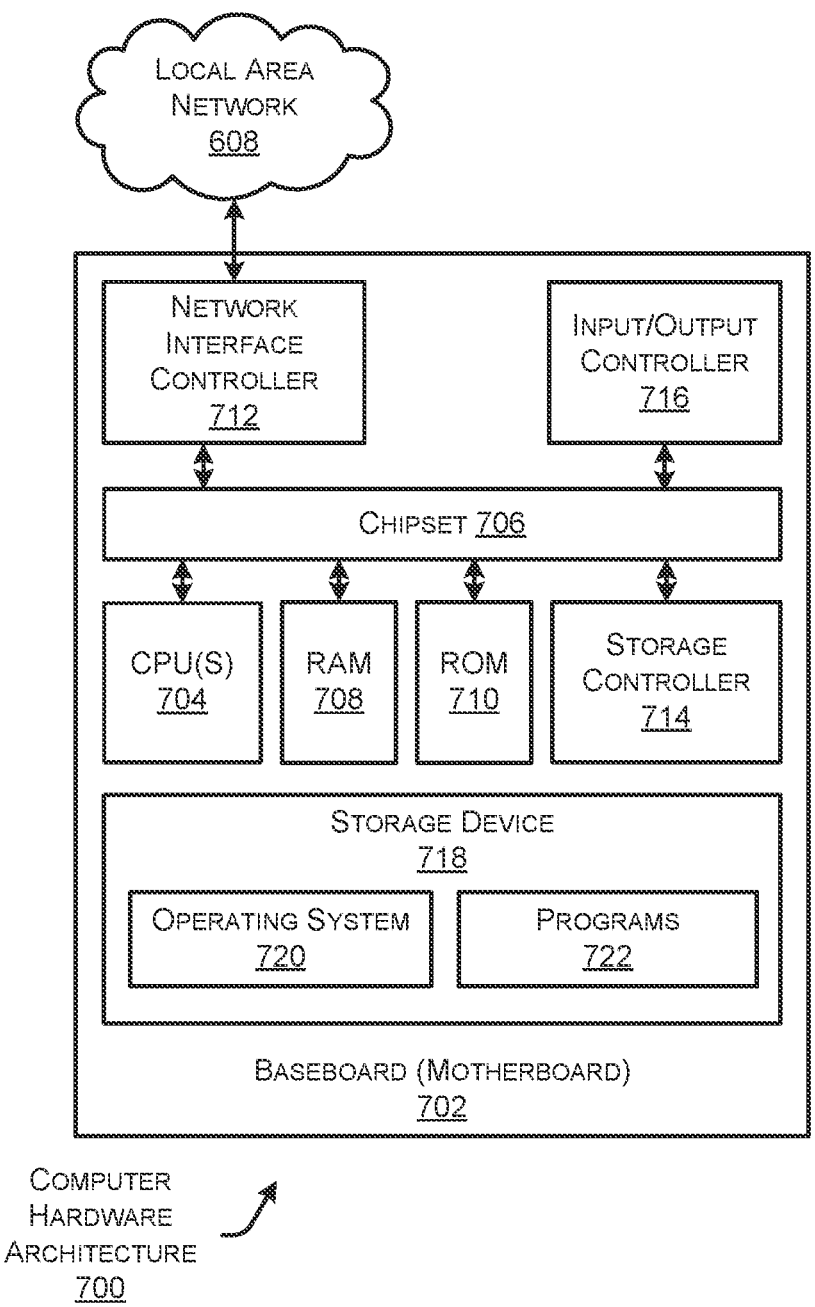
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the network 100, the SD-WAN 102, the WAN edges 104, the chaos level engine 108, the endpoints 114, and/or other systems or devices associated with the chaos level engine 108 and/or remote from the chaos level engine 108, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., the SD-WAN 102, the WAN edges 104, the chaos level engine 108, and/or the endpoints 114) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the network 100, the SD-WAN 102, the WAN edges 104, the chaos level engine 108, the endpoints 114, among other devices. The chipset 706 may include functionality for providing network connectivity through a Network Interface Controller (NIC) 712, such as a gigabit Ethernet adapter. The NIC 712 is capable of connecting the computer 700 to other computing devices within the network 100 and external to the network 100. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the network 100, the SD-WAN 102, the WAN edges 104, the chaos level engine 108, the endpoints 114, and or any components included therein, may be supported by one or more devices similar to computer 700. Stated otherwise, some or all of the operations performed by the network 100, the SD-WAN 102, the WAN edges 104, the chaos level engine 108, the endpoints 114, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the network 100, the SD-WAN 102, the WAN edges 104, the chaos level engine 108, the endpoints 114, and/or other systems or devices associated with the chaos level engine 108 and/or remote from the chaos level engine 108. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the SD-WAN 102, the WAN edges 104, the chaos level engine 108, the endpoints 114, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the network 100, the SD-WAN 102, the WAN edges 104, the chaos level engine 108, the endpoints 114 as described herein. The programs 722 may enable the devices described herein to perform various operations.

CONCLUSION

The examples described herein provide systems and methods that introduce a chaos level into a production environment. Further, the present systems and methods measure a range of predictable outcomes for automatically generating chaos experiments. The Chaos experiments are executed and controlled in order to determine how well the production environment can handle failures. Feedback regarding the effectiveness of the chaos level in the chaos experiment may be obtained and utilized to retrain the chaos introduced in the production environment in a subsequent chaos experiment with the chaos introduced in the subsequent chaos experiment include a percentage of the previous chaos introduced. The chaos levels described herein assist in understanding the risk of introducing chaos testing in a production environment and provides the ability to measure how far the chaos experimentation deviates away from a given network security, scalability, resiliency, and performance goals set for the production environment.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method comprising:
   receiving, at a chaos level engine, initial input parameters; and
   with the chaos level engine:
      determining scaled input parameters based on the initial input parameters, the scaled input parameters defining how the initial input parameters effect a computing environment to be tested;
      determining a chaos level for performing a chaos experiment on the computing environment based on the scaled input parameters;
      sending the chaos level to the computing environment for the chaos experiment;
      executing the chaos experiment on the computing environment while a production environment of the computing environment is live, the chaos experiment comprising instructions to alter at least one parameter in the computing environment;
      receiving, from the computing environment, feedback defining an impact caused by the chaos experiment created at the computing environment and an intended level of chaos; and displaying, on a user interface (UI), chaos level information, the chaos level information comprising:
information defining the chaos level introducible to the computing environment above which execution of the chaos experiment would create a disabling chaos within the production environment,
information defining the chaos level introducible to the computing environment at which no chaos experimentation occurs, and
information defining the chaos level introducible to the computing environment at which significant chaos experimentation occurs.

2. The method of claim 1, further comprising:
receiving, at the chaos level engine, the feedback;
utilizing the feedback to define adjusted input parameters;
determining scaled adjusted input parameters based on the adjusted input parameters, the scaled adjusted input parameters defining how the adjusted input parameters effect the computing environment;
determining a subsequent chaos level for performing the chaos experiment on the computing environment based on the scaled adjusted input parameters; and
sending the subsequent chaos level to the computing environment for the chaos experiment.

3. The method of claim 2, further comprising receiving, from the computing environment, subsequent feedback defining a subsequent impact created at the computing environment caused by the chaos experiment as defined by the subsequent chaos level and the intended level of chaos.

4. The method of claim 1, wherein the chaos level engine determines the chaos level based at least in part on at least one of topology-based telemetry, dynamic network telemetry, dynamic security telemetry, previously observed values determined by an intelligent artificial intelligence (AI) engine, or combinations thereof.

5. The method of claim 2, further comprising determining the initial input parameters, the scaled input parameters, the adjusted input parameters, the scaled adjusted input parameters, or combinations thereof based at least in part on metadata obtained from at least one computing device within the computing environment.

6. The method of claim 5, wherein the initial input parameters, the scaled input parameters, the adjusted input parameters, the scaled adjusted input parameters, or combinations thereof comprise metadata defining bandwidth, jitter, or latency, a number of nodes within the computing environment, or combinations thereof.

7. The method of claim 1, further comprising displaying on a user interface (UI) information defining the chaos level introduced to the computing environment or introducible to the computing environment.

8. A system comprising:
a processor; and
a non-transitory computer-readable media storing instructions that, when executed by the processor, causes the processor to perform operations comprising:
receiving, at a chaos level engine, initial input parameters; and
with the chaos level engine:
determining scaled input parameters based on the initial input parameters, the scaled input parameters defining how the initial input parameters effect a computing environment to be tested;
determining a chaos level for performing a chaos experiment on the computing environment based on the scaled input parameters;
sending the chaos level to the computing environment for the chaos experiment;
executing the chaos experiment on the computing environment while a production environment of the computing environment is live, the chaos experiment comprising instructions to alter at least one parameter in the computing environment;
receiving, from the computing environment, feedback defining an impact caused by the chaos experiment created at the computing environment and an intended level of chaos; and
displaying, on a user interface (UI), chaos level information, the chaos level information comprising:
information defining the chaos level introducible to the computing environment above which execution of the chaos experiment would create a disabling chaos within the production environment,
information defining the chaos level introducible to the computing environment at which no chaos experimentation occurs, and
information defining the chaos level introducible to the computing environment at which significant chaos experimentation occurs.

9. The system of claim 8, wherein the operations further comprise:
receiving, at the chaos level engine, the feedback;
utilizing the feedback to define adjusted input parameters;
determining scaled adjusted input parameters based on the adjusted input parameters, the scaled adjusted input parameters defining how the adjusted input parameters effect the computing environment;
determining a subsequent chaos level for performing the chaos experiment on the computing environment based on the scaled adjusted input parameters; and
sending the subsequent chaos level to the computing environment for the chaos experiment.

10. The system of claim 9, the operations further comprising receiving, from the computing environment, subsequent feedback defining a subsequent impact created at the computing environment caused by the chaos experiment as defined by the subsequent chaos level and the intended level of chaos.

11. The system of claim 8, wherein the chaos level engine determines the chaos level based at least in part on at least one of topology-based telemetry, dynamic network telemetry, dynamic security telemetry, previously observed values determined by an intelligent artificial intelligence (AI) engine, or combinations thereof.

12. The system of claim 9, the operations further comprising:
determining the initial input parameters, the scaled input parameters, the adjusted input parameters, the scaled adjusted input parameters, or combinations thereof based at least in part on metadata obtained from at least one computing device within the computing environment,
wherein the initial input parameters, the scaled input parameters, the adjusted input parameters, the scaled adjusted input parameters, or combinations thereof comprise metadata defining bandwidth, jitter, or latency, a number of nodes within the computing environment, or combinations thereof.

13. The system of claim 12, wherein the system comprises a secure access service edge (SASE) environment, a cloud access security broker (CASB), a chaos network controller (CNC), a software-defined wide area network (SD-WAN), a number of edge nodes, public cloud services, a domain controller (DC), an on-premise DC, the chaos level engine, number of endpoints, or combinations thereof.

14. The system of claim 8, the operations further comprising displaying on a user interface (UI) information defining the chaos level introduced to the computing environment or introducible to the computing environment.

15. A non-transitory computer-readable medium storing instructions that, when executed, causes a processor to perform operations, comprising:
receiving, at a chaos level engine, initial input parameters; and
with the chaos level engine:
determining scaled input parameters based on the initial input parameters, the scaled input parameters defining how the initial input parameters effect a computing environment to be tested;
determining a chaos level for performing a chaos experiment on the computing environment based on the scaled input parameters;
sending the chaos level to the computing environment for the chaos experiment;
executing the chaos experiment on the computing environment while a production environment of the computing environment is live, the chaos experiment comprising instructions to alter at least one parameter in the computing environment;
receiving, from the computing environment, feedback defining an impact caused by the chaos experiment created at the computing environment and an intended level of chaos; and
displaying, on a user interface (UI), chaos level information, the chaos level information comprising:
information defining the chaos level introducible to the computing environment above which execution of the chaos experiment would create a disabling chaos within the production environment,
information defining the chaos level introducible to the computing environment at which no chaos experimentation occurs, and
information defining the chaos level introducible to the computing environment at which significant chaos experimentation occurs.

16. The non-transitory computer-readable medium of claim 15, wherein the operations further comprise:
receiving, at the chaos level engine, the feedback;
utilizing the feedback to define adjusted input parameters;
determining scaled adjusted input parameters based on the adjusted input parameters, the scaled adjusted input parameters defining how the adjusted input parameters effect the computing environment;
determining a subsequent chaos level for performing the chaos experiment on the computing environment based on the scaled adjusted input parameters; and
sending the subsequent chaos level to the computing environment for the chaos experiment.

17. The non-transitory computer-readable medium of claim 16, the operations further comprising receiving, from the computing environment, subsequent feedback defining a subsequent impact created at the computing environment caused by the chaos experiment as defined by the subsequent chaos level and the intended level of chaos.

18. The non-transitory computer-readable medium of claim 15, wherein the chaos level engine determines the chaos level based at least in part on at least one of topology-based telemetry, dynamic network telemetry, dynamic security telemetry, previously observed values determined by an intelligent artificial intelligence (AI) engine, or combinations thereof.

19. The non-transitory computer-readable medium of claim 16, the operations further comprising:
determining the initial input parameters, the scaled input parameters, the adjusted input parameters, the scaled adjusted input parameters, or combinations thereof based at least in part on metadata obtained from at least one computing device within the computing environment,
wherein the initial input parameters, the scaled input parameters, the adjusted input parameters, the scaled adjusted input parameters, or combinations thereof comprise metadata defining bandwidth, jitter, or latency, a number of nodes within the computing environment, or combinations thereof.

20. The non-transitory computer-readable medium of claim 15, the operations further comprising displaying on a user interface (UI) information defining the chaos level introduced to the computing environment or introducible to the computing environment.

\* \* \* \* \*